R. Montgomery.
Mode of Constructing Iron Ships.
No. 2,243. Reissued May 15, 1860.
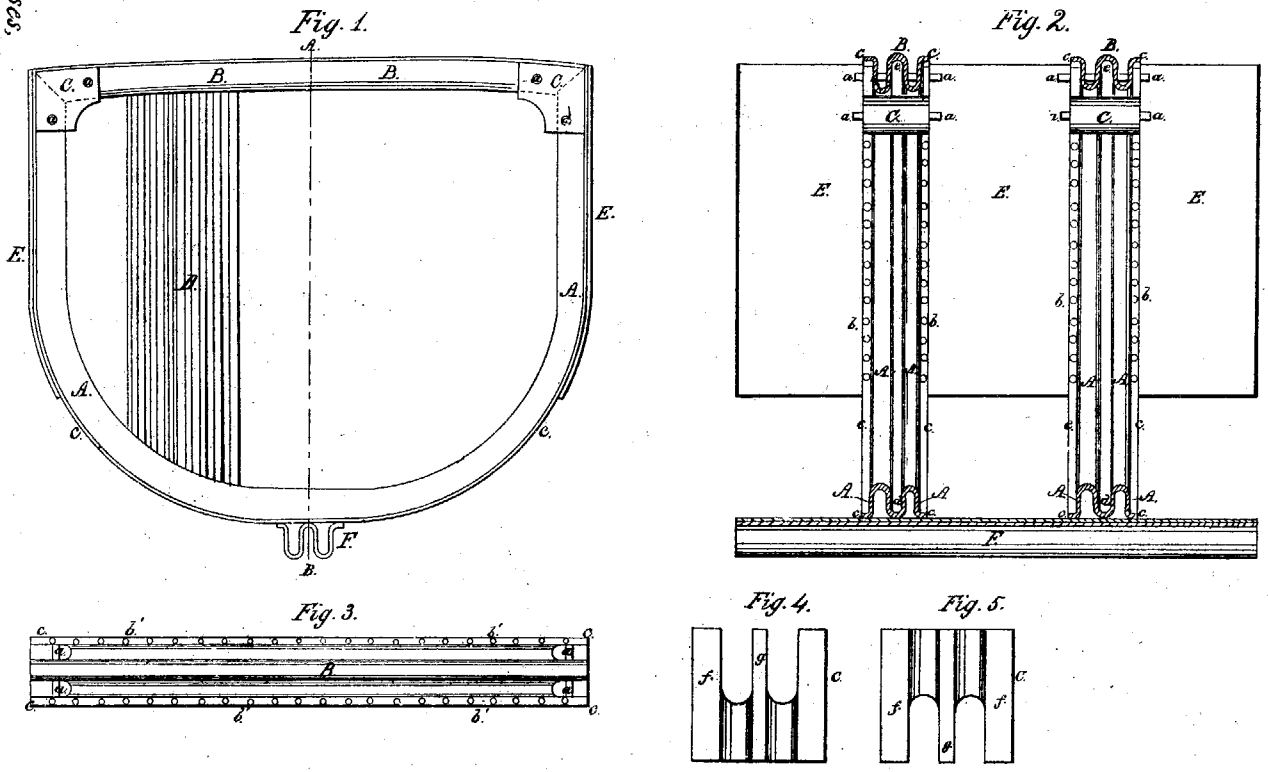
Witnesses,
Thos. H. Dodge
John Quincy Adams
Inventor:
R. Montgomery
N. PETERS, PHOTO-LITHOGRAPHER, WASHINGTON, D. C.

UNITED STATES PATENT OFFICE.

RICHARD MONTGOMERY, OF NEW YORK, N. Y., ASSIGNOR, BY MESNE ASSIGNMENTS, TO MARY JANE MONTGOMERY.

IMPROVEMENT IN IRON SHIPS.

Specification forming part of Letters Patent No. 26,367, dated December 6, 1859; Reissue No. 2,243, dated May 15, 1866.

DIVISION A.

*To all whom it may concern:*

Be it known that I, RICHARD MONTGOMERY, of the city, county, and State of New York, did invent certain new and useful Improvements in the Mode of Constructing Iron Ships, for which Letters Patent of the United States were granted me, bearing date the 6th day of December, 1859, which Letters Patent, by reason of an insufficient and defective specification, are inoperative and invalid, and which error arose from inadvertence, accident, or mistake, without any fraudulent or deceptive intention; therefore, in virtue and by authority of the laws of the United States for such cases made and provided, I do hereby surrender the said patent, for the purpose of reissuing it as two distinct patents.

The following, which relates to the manner of constructing said ship, which I hereby declare to be a full and exact description thereof, I make the first division of the reissue.

To enable others skilled in the art to use and apply my invention, I will proceed to describe it, availing myself of the drawings hereto attached and forming a part of this specification.

In these drawings, Figure 1 represents a transverse vertical section of the ship at or near "midship". Fig. 2 represents a section of the ship near the midship, as seen from the interior of the hull. Fig. 3 represents a top or plan view of one of the deck-beams. Figs. 4 and 5 represent details relating to the manner of connecting the ribs to the deck-beams. Fig. 6 represents the form and structure of one of the ribs near the midship. Fig. 7 represents one of the ribs near the bow of the ship. Fig. 8 represents one of the ribs near the stern.

In the construction of this ship I use corrugated beams of iron or other appropriate metal for making the ribs, deck-beams, keel, keelsoms, &c., covering the sides, and, if necessary, the decks, with plate metal, and making the connections of the several parts by metallic bolts, pins, knee-joints, &c., and, when necessary, divide the cavity of the hull or the hold into fire-proof compartments by corrugated iron partitions, so that the whole structure becomes strong, buoyant, and safe in a preeminent degree over ships all wood, or chiefly so.

A A, fig. 1, is one of the ribs of the ship, near the middle of its length, where they assume a nearly semi-elliptic form, corresponding to the figure of the cross-section of the hull at this part. This is repeated in Fig. 6. Fig. 8 shows a rib near the stern or quarter, where it is necessary to give not only a peculiar curve to the rib, but also a twist or shear toward one or both extremities, to adapt it to the line of the form or run of this part of the hull. Fig. 7 shows another form of curvature, such as is required near the bow. Thus we see, as is well known, every rib in a ship's hull requires a different form of curvature, involving great loss of material, when wood is used, not only in removing surplus matter to get this form, but in increase in size of the rib, to compensaqe for the loss of strength incident to wood in such form; but this is not the case in using iron or other metallic material. This is well known, however, to naval constructers and others, and need not be dwelt upon. The great question is, what form of rib, or rather of the bar of which it is to be made, affords the greatest strength with equal weight of material? The superiority of the corrugated beam over all others in this respect is so well known and generally acknowledged that no argument in its favor is necessary. The difficulty of giving it the required curves without materially affecting its peculiar form, and consequent qualities for strength, has heretofore been such as to prevent its use in any other condition than as a straight bar; but having overcome this difficulty, as will be seen in the specification, under the second division of the reissue of my patent, this objection to its use in the construction of ships no longer exists.

B, Fig. 1, shows the position the corrugated beam occupies as the deck-beam. The same letter in Fig. 3 is a top view of the same, detached. It will be seen that the latter at each extremity *a a* has its corrugation cut out or off, giving it a three-forked appearance. The forks enter into similarly-formed notches or recesses in the upper end of the ribs, as seen in Fig. 2.

C, Figs. 1 and 2, is a block of wrought or cast iron performing the functions of a knee in wooden vessels, for strengthening this connection. It has three flanges, one of which enters the middle groove of the adjacent beam or rib, and the whole secured together by pins *a a*. Figs. 4 and 5 show the manner of cutting out the end of the ribs and beams on a larger scale. Other means may be used, if deemed necessary, for making this connection. In Fig. 1 the dotted lines at C show the ends beveled, and the ends may also be lapped over one upon another. In the latter case it would be better to let the end of the deck-beam rest upon the end of the rib.

F, Figs. 1 and 2, shows the keel of the vessel and its mode of application. Similar corrugated beams, though not shown in the drawings, may be used for keelsons.

D represents a portion of a partition or bulkhead made of sheets of corrugated metal. These are let into the groove in the beams of the hull and deck, where they may be calked, if it be desirable to make each chamber water-tight as well as fire-proof.

E E, Figs. 1 and 2, show the metallic plating with which the ship is to be covered. The drawings show it as only covering a part of the side of the hull; but it is intended as a complete covering for the whole bottom, and also for the deck, if thought proper. This plating is secured to the ribs and beams by rivets, as shown at *b b*, Fig. 2, and *b′ b′*, Fig. 3.

Having thus fully set forth my invention, what I claim therein, and desire to secure by Letters Patent of the United States, is—

1. The use of corrugated metallic beams, whether straight, curved, bent, or sheared, in the construction of ships, steamers, or other vessels.

2. The use of corrugated metallic plates or sheets in the construction of bulk-heads or partitions for forming fire-proof or water-proof compartments in the holds of ships, steamers, and other vessels.

3. The block or knee C, when constructed substantially in the manner and for the purpose set forth.

4. The metallic plate E, when forming the plating of the sides, and, if required, the flooring of the deck, in combination with the corrugated beams to which they are attached, substantially as shown and described.

RICHARD MONTGOMERY.

Witnesses:
H. KING,
EDM. F. BROWN.